INVENTORS
ALAN SALISBURY LAMBURN,
RANDLE LESLIE ABBOTT.
BY
Glascock Downing & Seebold
ATTORNEY

INVENTORS
ALAN SALISBURY LAMBURN,
RANDLE LESLIE ABBOTT.
ATTORNEY

Aug. 5, 1969　　　A. S. LAMBURN ET AL　　　3,459,285
TRANSMISSION AND CLUTCH CONTROL
Filed June 9, 1967　　　　　　　　　　　　　7 Sheets-Sheet 4

INVENTORS
ALAN SALISBURY LAMBURN,
RANDLE LESLIE ABBOTT.
BY
Glascock, Downing & Seebold
ATTORNEY

Aug. 5, 1969    A. S. LAMBURN ET AL    3,459,285
TRANSMISSION AND CLUTCH CONTROL

Filed June 9, 1967    7 Sheets-Sheet 7

FIG. 12.

INVENTORS
ALAN SALISBURY LAMBURN,
RANDLE LESLIE ABBOTT.
BY
ATTORNEY 3,459,285
TRANSMISSION AND CLUTCH CONTROL
Alan Salisbury Lamburn, Kencott, via Lechlade, and Randle Leslie Abbott, Leamington Spa, England, assignors to Auto Transmissions Limited, London, England
Filed June 9, 1967, Ser. No. 644,913
Claims priority, application Great Britain, June 6, 1966, 26,903/66
Int. Cl. F16d 67/00, 13/00, 21/08
U.S. Cl. 192—3.5
30 Claims

ABSTRACT OF THE DISCLOSURE

The invention relates to the control of an auxiliary change-speed gearing of the kind in which ratio changes are effected by an axially-movable toothed coupling which is movable optionally between a first position in which it engages a first complementary toothed coupling to provide drive at one ratio and a second position in which it engages a second complementary toothed coupling to provide drive at the other ratio. The invention is particularly, but not exclusively, concerned with the control of the change-speed epicyclic gearing taught in our United States patent application No. 597,463.

---

Auxiliary change-speed gearings are commonly used in the automotive industry in series with a main change-speed gearing. Although epicyclic two-speed gearings providing a direct drive ratio and a planetary drive ratio are usually employed, other forms of gearing may be used. With an auxiliary epicyclic gearing providing two ratios, the planetary ratio may be arranged to be a reduction or underdrive ratio, or alternatively to be a multiplication or overdrive ratio.

Irrespective of the type of gearing employed as an auxiliary gearing and the ratios provided, a gear changing means is required for effecting the ratio changes. Such a gear changing means with a epicyclic gearing will be a clutch-brake unit for clutching the reaction member optionally to another element of the gearing for providing the direct drive ratio or for braking the reaction member against rotation for providing the planetary drive ratio. On the other hand, with a simple layshaft auxiliary gearing, a double clutch unit would be employed.

As stated in our said patent application hitherto proposed gear changing means have employed fluid-operable pistons and cylinders acting in opposition to springs, together with unidirectional clutches and sophisticated fluid circuits for providing smooth engagement and disengagement of the ratios. Although these previously proposed arrangements have given very successful results, there is a demand for a cheaper unit. To this end our said patent application proposed an auxiliary change-speed gearing utilising toothed couplings rather than the fluid-operable clutches and brakes previously used.

With an auxiliary change-speed gearing utilising a fluid-operable clutch and brake, the ratio changes are frequently arranged such that the drive between the power input and output shafts of the gearing continues whilst the ratio change is being made—in other words a "power fear-change" occurs. However, this is not possible with an auxiliary change-speed gearing utilising toothed couplings as the toothed coupling for providing one drive ratio must be fully disengaged before the toothed coupling for providing the other ratio can be engaged, and the drive between the power input and output shafts of the gearing is therefore broken. To assist the engagement of the previously disengaged toothed couplings, it is desirable to disengage the clutch between the engine and the main change-speed gearing. Another important factor concerning the engagement of the previously disengaged toothed couplings is that a sufficient delay must occur to allow synchronism and subsequent engagement of the toothed couplings before any power is applied to the auxiliary gearing.

An object of this invention is to provide an improved control means for an auxiliary change-speed gearing of the kind in which the ratio changes are effected by an axially-movable toothed coupling which is movable optionally between a first position in which it engages a first complementary toothed coupling to provide drive at one ratio, and a second position in which it engages a second complementary toothed coupling to provide drive at the other ratio.

According to the invention control means, for an auxiliary change-speed gearing of the kind in which ratio changes are effected by an axially-movable toothed coupling which is movable optionally between a first position in which it engages a first complementary toothed coupling to provide drive at one ratio and a second position in which it engages a second complementary toothed coupling to provide drive at the other ratio, includes a driver-actuable control member arranged when operated to disengage a clutch arranged between an engine and a main change-speed gearing associated with the auxiliary change-speed gearing, said driver-actuable control member arranged to produce a signal when operated to a predetermined greater extent than necessary for usual disengagement of the clutch, and an actuator responsive to said signal for effecting the movement of the axially-movable toothed coupling to engage one of the said complementary toothed couplings.

The driver-actuable control member may be arranged to alter the pressure in a fluid circuit for displacing a clutch disengaging member, and the actuator is arranged to effect the movement of the axially-movable toothed coupling when the pressure of the fluid reaches a predetermined value at which the clutch is fully disengaged. Preferably the actuator includes a fluid pressure operable piston slidably supported in a coacting cylinder, and the piston is arranged for moving the axially-movable toothed coupling when operating fluid pressure is applied to the piston. Furthermore, preferably the fluid circuit is connected to the actuator through a pressure relief valve which will only allow fluid to pass when the said predetermined pressure is exceeded.

Successive operations of the driver-actuable control member may be arranged to move the axial-movable toothed coupling initially from the said first position to the said second position and is arranged subsequently to return the axially-movable toothed coupling from the second position to the first position, whereby successive operations of the driver-actuable control member will effect ratio changes alternately to the said one and to the said other drive ratios.

The control means may include a non-return valve arranged operatively between the fluid circuit and the actuator to allow the free exhaust of fluid from the actuator when the cutch is being re-engaged.

Means may be provided for delaying the re-engagement of the clutch whilst the axially-movable toothed coupling is engaging a complementary toothed coupling.

The actuator may be operatively connected to the axially-movable toothed coupling through a pair of opposed spring means whereby the resilience of the spring means will allow a time delay to occur between the operation of the actuator for moving the axially-movable toothed coupling and the engagement of the latter with the appropritae complementary toothed coupling whereby to allow synchronism to take place between the axially-movable toothed coupling and the said complementary toothed coupling before they engage.

The axially-movable toothed coupling may be biased into engagement with the first complementary toothed coupling, and the actuator means includes an actuating member movable in opposition to the bias whenever a signal is produced, and a latch means is arranged such that a first signal received by the actuator means will cause the actuating member to move the axially-movable toothed coupling to be engaged with the second complementary toothed coupling against the action of the bias and to be retained by the action of the latch means, and a subsequent signal received by the actuator means will cause the actuating member to release the latch means for the bias to return the axially-movable toothed coupling into engagement with the first complementary toothed coupling.

The actuator piston may be biased to an inoperative position by a spring load of such value that the piston cannot be moved by the fluid pressure until the pressure of the fluid exceeds the said predetermined value.

Furthermore, the actuator piston may be biased by a light spring load to an inoperative position, the fluid circuit is connected to the actuator piston through a pressure relief valve which will only allow fluid to pass when the said predetermined pressure is exceeded, and a non-return valve is arranged operatively between the fluid circuit and the actuator piston to allow the free exhaust of fluid from the actuator cylinder when the clutch is being re-engaged. Preferably the means for delaying the reengagement of the clutch is a one-way restrictor means arranged to allow the fluid to flow freely into the cylinder of the clutch disengaging piston but to slow down the exhaust of fluid from the cylinder of the clutch disengaging piston. The size of the restrictor is chosen in relation to the operating characteristics of the clutch and the engagement characteristics of the axially-movable toothed coupling so that the latter will engage before the former. The one-way restrictor may be also arranged to slow down the exhaust of fluid from the actuator cylinder whilst the clutch is being re-engaged. The increased flow of fluid through the actuator will, therefore, allow the fluid pressure in the cylinder of the clutch disengaging piston to fall even more slowly.

According to a further feature of the invention, an additional control means may be arranged to be operated if the gear ratio of the auxiliary gearing is to be changed, the actuator is inhibited from being actuated by a baulking device, and operation of the additional control means is arranged to inhibit the action of the baulking device. This ensures that the auxiliary gear ratio can only be changed by joint operation of the clutch control member and the additional control means. Preferably the baulking device is movable against the action of a return spring by the additional control means and is provided wih a gate through which the actuator piston can only pass when the additional control means is operated.

According to yet another feature, an additional control means may be arranged to be operated if the gear ratio of the auxiliary gearing is to be changed, a fluid control valve is arranged operatively between the fluid circuit and the actuator cylinder for preventing the flow of fluid into the actuator cylinder, and the additional control means on operation is arranged to actuate the fluid control valve to a position in which it allows fluid to flow from the fluid circuit into the actuator cylinder. Preferably the fluid control valve is a spool valve arranged to interrupt the fluid line between the fluid circuit and the actuator cylinder, the additional control means is arranged to move the spool valve against a return bias into a first position in which the fluid circuit communicates with an area of the spool valve opposed to the return bias, a latch means is arranged to hold the spool valve in the said first position, whereby increase of fluid pressure in the fluid circuit for disengaging the clutch will move the spool valve to a second position in which the fluid line between the fluid circuit and the actuator cylinder is re-established, and movement of the spool valve to the second position releases the latch means whereby as soon as the pressure of the fluid circuit drops the spool valve will be returned by its return bias to the initial position in which the fluid circuit is isolated from the said area of the spool valve and the fluid line is again interrupted.

According to a further feature the actuator may include a first portion acting through a first lever means for moving the axially-movable toothed coupling from the first position to the second position, a second portion acting through a second lever means for moving the axially-movable toothed coupling from the second position to the first position, a baulking means operable between one position in which it will prevent movement of the first lever means and another position in which it will prevent movement of the second lever means, and a bias means acting on the baulking means and arranged to be operated by the movement of the axially-movable toothed coupling such that when the axially-movable toothed coupling is in the first position the bias means will urge the baulking means to the said another position and when the axially-movable toothed coupling is in the second position the bias means will urge the baulking means to the said one position, whereby the application of successive signals simultaneously to energise both portions of the actuator will effect movement of the axially-movable toothed coupling alternately to the first and the second positions.

According to yet another feature the baulking means may include a lever supported by a central pivot and having a baulking member arranged at each end, the bias means is arranged to act on the lever to rotate it in one direction so that the baulking member at one end of the lever will engage the second lever means to inhibit its movement when the axially-movable toothed coupling is in the first position, and the bias means is arranged to be moved past the pivot of the lever when the axially-movable toothed coupling is moved to the second position so that the bias means will act on the lever to rotate it in the other direction whereby the baulking member at the other end of the lever will engage the first lever means to inhibit its movement. Preferably a further bias means is arranged operatively between the first and the second lever means such that the lever means are urged to return both portions of the actuator to inoperative positions when the clutch is being re-engaged.

Alternatively the baulking means may include two levers each supported at one end by a fixed pivot and having a respective baulking member at the other end, each of the baulking levers is arranged such that it is movable to a position to inhibit movement of one of the said lever means, the two levers are spaced apart by a connecting link such that when one of the two baulking members is engaged with the corresponding lever means the other baulking member will be disengaged from its corresponding lever means, and the bias means includes two springs each coupled to a different one of the levers and connected to the axially-movable toothed coupling, the springs arranged such that when the axially-movable toothed coupling is in the first or second position the springs will bias the levers for one or other of them to inhibit movement of the second or the first lever means respectively.

The control means may include means optionally operable by the driver to inhibit the transmission of the signal to the actuator whereby the driver may select when the next signal produced by the driver-actuable control member will effect a change of drive ratio. Preferably the means optionally operable by the driver includes an operating fluid control valve movable between one position in which it connects the fluid system to one part of the actuator and connects another part of the actuator to a line for returning fluid from that part of the actuator to a fluid reservoir, and another position in which it connects the said one part of the actuator to the line for returning fluid to the reservoir and the said another part to the operating fluid system.

Figures 3, 4:
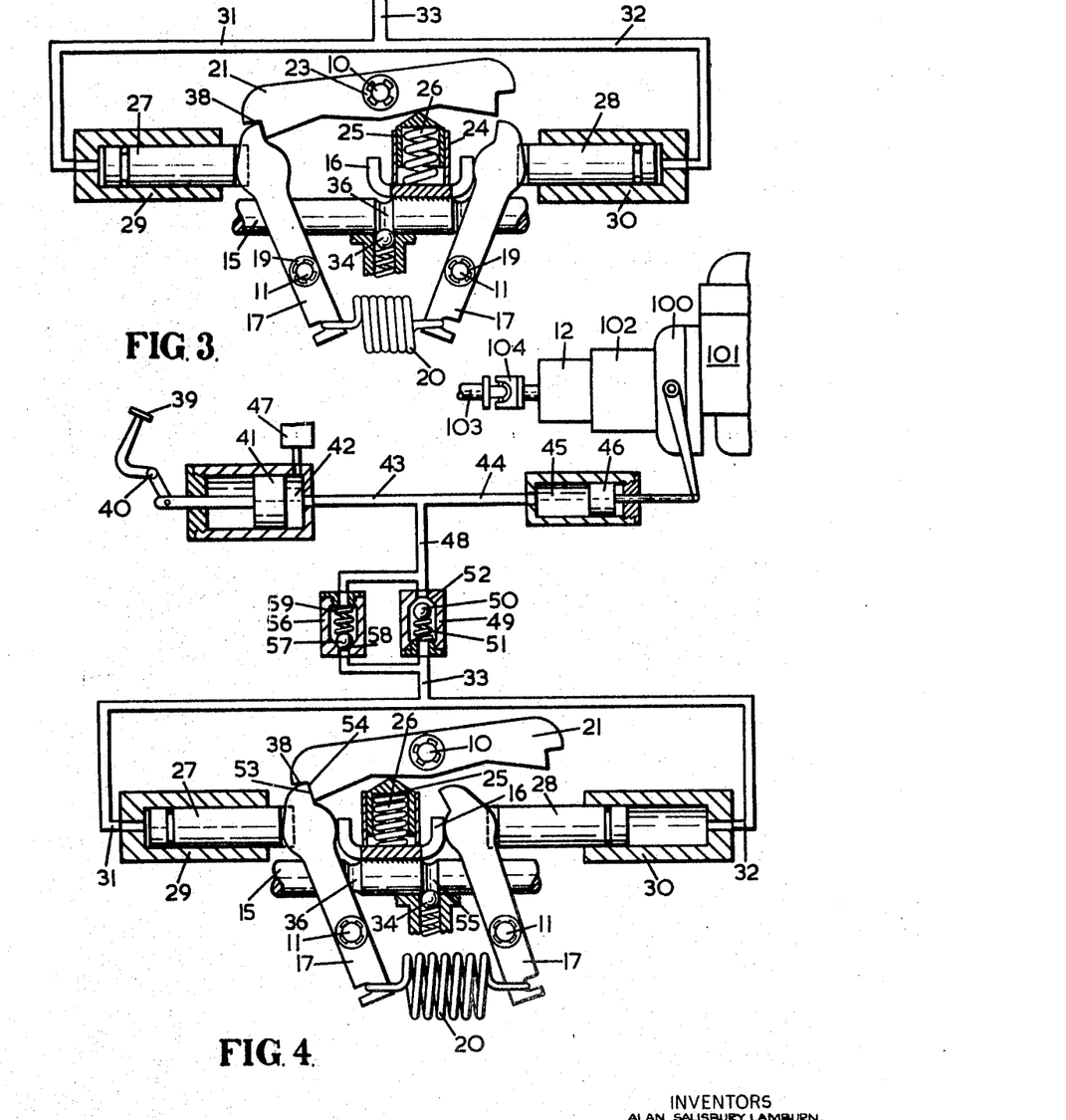
FIGURES 3 and 4 illustrate different phases of the operation of the embodiment shown in FIGURE 2, FIGURE 4 being shown with the complete control circuit.

The invention is illustrated, by way of example only, in the accompanying drawings, which are of a diagrammatic nature only, as the details of construction will be well understood by those versed in the art. Examples of auxiliary change-speed gearings to which this invention is particularly, but not exclusively, applicable are illustrated in FIGURES 1 and 4 and are described in the associated description of our aforesaid patent application.

Figure 1:
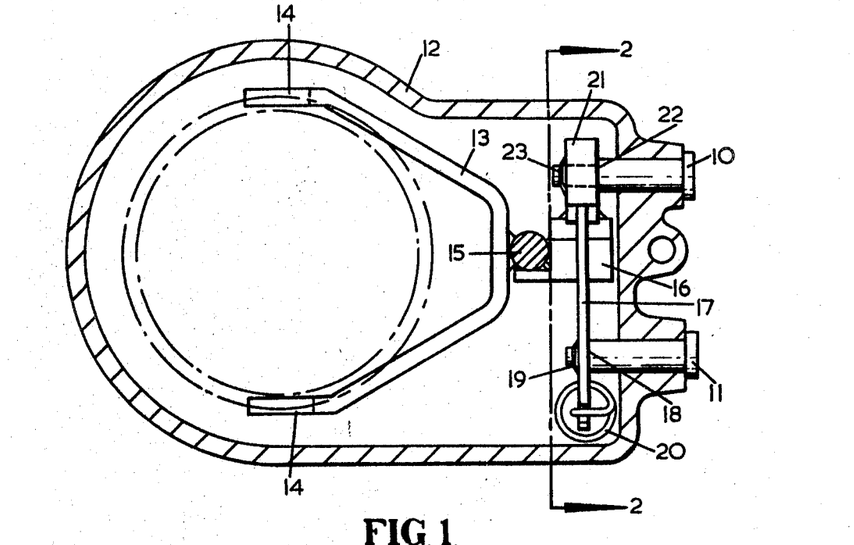
FIGURE 1 is a section taken normal to the axis of an auxiliary change-speed gearing.

In FIGURE 1, steel pins 10, 11 are pressed into the aluminium casing 12 of an auxiliary change-speed gearing. A steel selector fork 13 is engaged at its tips 14 in a groove formed in part of an axially-movable toothed coupling. At its right hand end the selector fork 13 is welded to a steel bar 15 which is supported for axial sliding in bores formed in the casing 12. The steel bar 15 is in turn welded to a U-shaped steel bracket 16 which is arranged to lie between two sheet steel levers 17, each of which is pivoted on one of the two pins 11 and is axially located between a shoulder 18 formed on each pin and a spring steel retaining washer 19 engaged in a groove in the pin 11. A helically coiled tension spring 20 engages in slots adjacent the lower ends of the levers 17 to pull the upper ends of the levers apart. A further steel lever 21 is pivoted at its centre on the pin 10 and is axially located between a shoulder 22 and a spring steel retaining washer 23.

Figure 2:
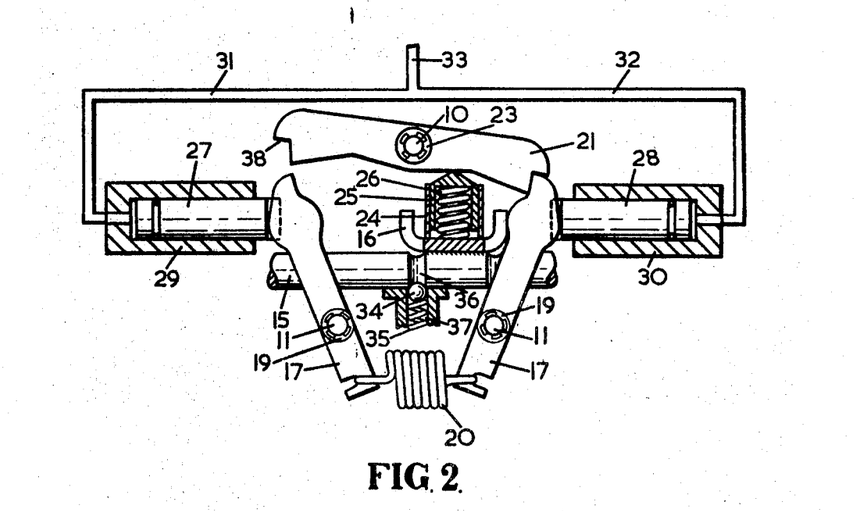
FIGURE 2 is a fragmentary section along the line 2—2 in FIGURE 1.

The operation will now now be described with reference to FIGURES 2, 3 and 4 in which items will be accorded to the same reference numerals as they were in FIGURE 1. In a cylinder 24 fast with the steel bracket 16 a hollow conically ended piston 25 is slidably supported for movement radial to the bar 15 and is urged away from the bar 15 by a helically coiled compression spring 26. The sides of the levers 17 are shaped, near the upper ends, for engagement with the ends of two axially directed pistons 27 and 28 slidable in corresponding fluid pressure operable cylinders 29 and 30 formed in part of the casing 12. Operating fluid is supplied to, and exhausted from, the cylinders 29 and 30 by lines 31 and 32 which are connected to a common lines 33.

The bar 15 is inhibited from accidental movement by a ball detent 34 urged by a helically coiled compression spring 35 into a groove 36 formed in the bar 15. The spring 35 and ball 34 are located in a radially disposed bore 37 formed in part of the casing 12. In FIGURE 2, the fluid operating pressure has just been reduced so that the spring 20 has urged the levers 17 to move the pistons 27 and 28 apart thereby exhausting the operating fluid from the cylinder 29. The conical end of the piston 25 engages the underside of the lever 21 urging it to pivot in an anti-clockwise direction so that the right hand end of the lever 21 will become disengaged from the right hand lever 17, and the lever 21 will rotate anti-clockwise until a shoulder 38 formed in the left hand end will abut the end of the left hand lever 17. This position is shown in FIGURE 3 which represents a stable condition in which no further action will occur until operating fluid under pressure is again supplied through the line 33.

In FIGURE 4 a driver-actuable clutch pedal 39 is supported by a pivot 40 and is arranged, when depressed, to operate a piston 41 in a cylinder 42 to displace operating fluid along the lines 43 and 44 to a clutch slave cylinder 45 in which a piston 46 is moved to the right by the fluid to operate a clutch 100 arranged operatively between an internal combustion piston engine 101 and a main change-speed gearing 102 connected to drive the auxiliary change-speed gearing 12. The latter is arranged to drive a propeller shaft 103 through a universal drive coupling 104. If desired, the auxiliary change-speed gearing could be arranged elsewhere, for instance between the clutch 100 and the main change-speed gearing 102. The fluid system is charged from a reservoir 47 and a line 48 connects the lines 43 and 44 to a pressure relief valve 49 in which a ball 50 is urged by a preloaded helically coiled compression spring 51 against a conical seating 52. The outlet of the pressure relief valve 49 is connected to the line 33 to feed the cylinders 29 and 30. The preload of the spring 51 is arranged so that ball 50 lifts off the conical seat 52 at a fluid operating pressure at which the clutch has become fully disengaged and has reached a stop, so that further depression of the clutch pedal 39 will transmit fluid through the pressure relief valve 49 to urge the pistons 27 and 28 towards each other.

The piston 27 and the left hand lever 17 are inhibited from movement since a face 53 on the lever 17 is arranged to abut a corresponding end face 54 of the lever 21 formed adjacent the shoulder 38. However, the piston 28 will be extended by the fluid pressure to push the right hand lever 17 to the left and thereby to slide the abutting U-shaped bracket 16 and the bar 15 to the left until the bracket 16 abuts the left hand lever 17. At this position the ball 34 has been disengaged from the groove 36 and is engaged with another groove 55 to inhibit later accidental movement of the bar 15. The distance between the grooves 36 and 55 are arranged such that when the ball 34 engages the groove 36 one gear ratio of the auxiliary change-speed gearing is engaged and when the ball 34 engages the groove 55 the other ratio is engaged.

As the right hand lever 17 is moved by the extension of the piston 28, the spring 20 is extended and the spring 26 is compressed, due to the sliding of the conically ended piston 25 along the shaped underside of the lever 21. Connected in parallel with the pressure relief valve 49 is a non-return valve 56 in which a ball 57 is lightly biased against a conical seating 58 by a compression spring 59, whereby fluid is prevented by-passing the pressure relief valve 49 when flowing from the line 43 to the line 33 but is allowed to return from the cylinders 29 and 30 to the clutch cylinder 42. As the clutch pedal 39 is released the pressure in the system falls so that the spring 20 is able to move the right hand lever 17 to retract the piston 28 and return the fluid through the non-return valve 56 to the line 43 and the cylinder 42. When the piston 28 is fully retracted into the cylinder 30, the pressure in the clutch operating system will continue to fall until the re-engagement of the clutch commences.

The system below the fluid line 33 will now be arranged identically to FIGURE 2, except that the lever 21 will be tilted to engage the left hand lever 17 rather than the right hand lever 17, and the rod 15, the bracket 16 and the piston 25 are in the left hand position. It will therefore be appreciated that each time that the clutch pedal 39 is depressed past the point corresponding to full disengagement of the clutch, a change of drive ratio will be made either upwards or downwards.

Figure 5:
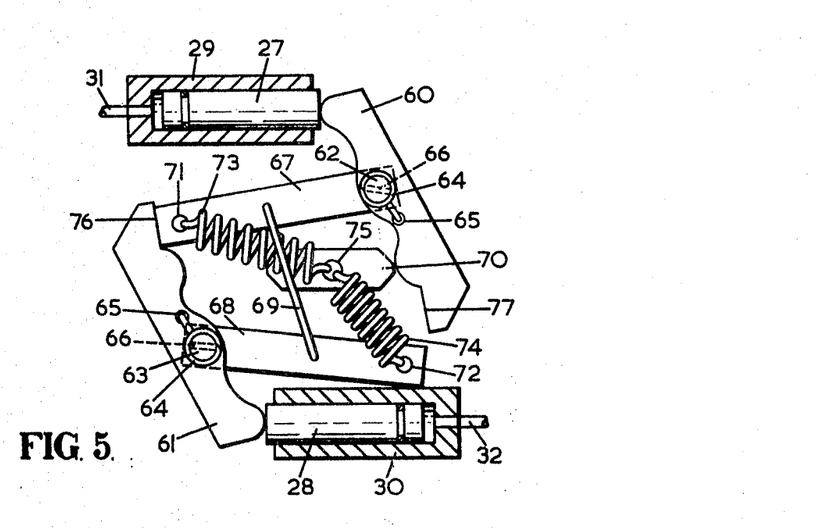
FIGURES 5, 6 and 7 illustrate different phases of the operation of an alternative embodiment to FIGURES 2, 3 and 4.
Figure 6:
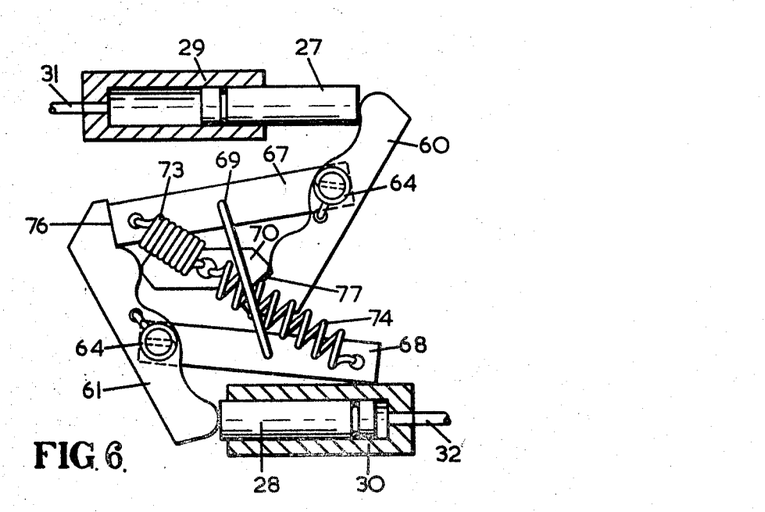
Figure 7:
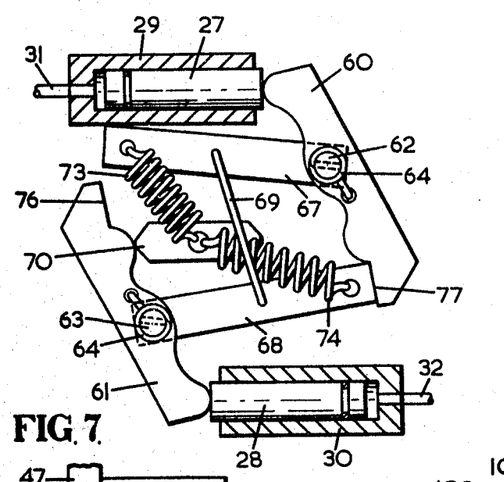

FIGURES 5, 6 and 7 illustrate phases of operation of an alternative embodiment to that illustrated in FIG- URES 1 to 4 but components which fulfil the same function both embodiments have been allocated the same reference numerals.

Operating fluid supply lines 31 and 32 are connected to cylinders 29 and 30 in which pistons 27 and 28 respectively engage shaped portions of steel levers 60 and 61 pivoted on steel pins 62 and 63 fast with the case of the auxiliary change-speed gearing. On each pin 62 and 63 is a helically coiled torsion spring 64 of which one end engages in a hole 65 in each lever and the other end engages in a radial hole 66 in each pin 62 and 63 so the levers 60 and 61 are respectively biased towards the pistons 27 and 28. Two further steel levers 67 and 68 are respectively pivoted near one end on the pins 62 and 63 and are spaced apart by a link 69 pivoted in each lever 67 and 68.

A steel member 70 is welded to an unseen bar corresponding to the bar 15 in the previous embodiment, to which the selector fork is fastened. In the ends of the levers 67 and 68 remote from the pins 62 and 63 holes 71 and 72 are formed into which the ends of preloaded helically coiled tension springs 73 and 74 are hooked. The other ends of the springs 73 and 74 are hooked into a hole 75 formed in the member 70. Although the control circuit for FIGURES 5 to 7 is not shown, it will be appreciated that the lines 31 and 32 would be supplied in exactly the same manner as described with reference to FIGURE 4.

In FIGURE 5 the system is shown in a stable condition with the member 70 in its right hand position corresponding to one drive ratio being engaged. The operating fluid pressure is reduced as described with reference to FIGURE 2 so that the pistons 27 and 28 are retracted. The tension in the spring 73 is greater than the tension in the spring 74 so that the lever 67 has been rotated until its end remote from the pin 62 abuts a face 76 of the lever 61 and the link 69 has therefore moved the lever 68 so that its end remote from the pin 63 is not engaged with a face 77 of the lever 60.

As in the embodiment illustrated in FIGURES 1 to 4, no operating fluid pressure is applied to the cylinders 29 and 30 until the clutch is fully disengaged, after which further depression of the clutch pedal supplies pressurised operating fluid to the lines 31 and 32. As shown in FIGURE 6, the piston 28 is inhibited from extension since the lever 61 is jammed by the lever 67 engaging the face 76. However, the piston 27 is extended by the fluid pressure to pivot the lever 60 in a clockwise direction so that the member 70 is slid to the left by its coaction with the lever 60, until it is stopped by abutting the lever 61, whereby a change of gear ratio is effected in the auxiliary change-speed gearing.

As the clutch pedal is released, the operating fluid pressure will drop and the lever 60 will be rotated anticlockwise by its spring 64 to retract the piston 27 for exhausting the fluid from the cylinder 29. The extension of the spring 74 is now greater than that of the spring 73 so that as soon as the piston 27 is fully retracted, the lever 67 will be pivoted in a clockwise direction out of engagement with the face 76 of the lever 61 and the lever 68 will be rotated in an anti-clockwise direction until its end remote from the pin 63 engages the face 77 of the lever 60. This phase of the operation is shown in FIGURE 7 and represents a stable condition corresponding to FIGURE 5, except that the other gear ratio of the auxiliary change-speed gearing is engaged. Thus, each time fluid pressure is applied to the lines 31 and 32 due to the clutch pedal being depressed past the point corresponding to full disengagement of the clutch, a change of drive ratio will be made either upwards or downwards.

Figure 8:
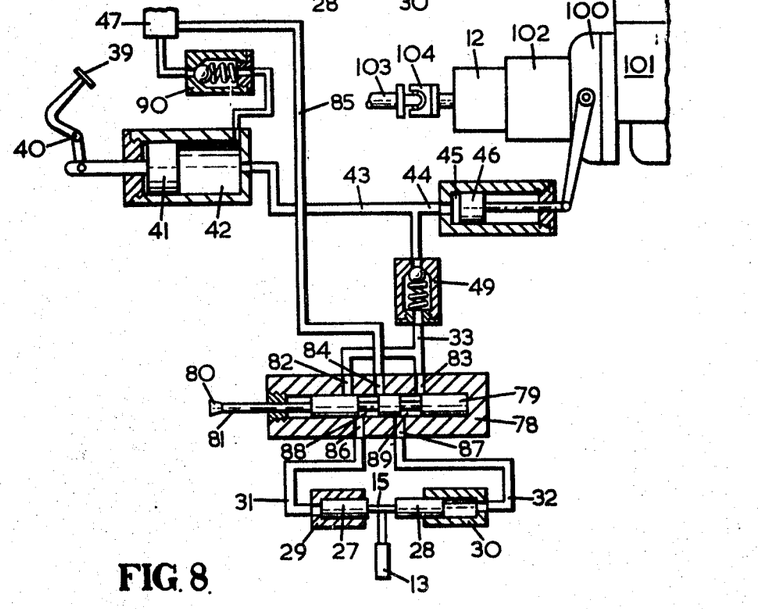
FIGURE 8 illustrates a different embodiment of the invention.

A third embodiment of the invention is shown in FIGURE 8 in which the clutch operating system and the pressure relief valve 49 are arranged to operate as in the previous embodiments. In this case the pistons 27 and 28 in the cylinders 29 and 30 are arranged to operate the bar 15 directly to move the selector fork 13 for effecting gear ratio changes in the auxiliary change-speed gearing 12. At some position convenient for operation by the driver, an operating fluid controlling spool valve 78 is arranged in which a spool 79 is movable by the driver adjusting a knob 80 and an interconnecting rod 81 to slide the spool 79 between a left and a right hand position, each corresponding to one of the two gear ratios. In the valve 78 two inlet ports 82 and 83 are connected to the fluid supply line 33, an exhaust port 84 is connected by a line 85 to the operating fluid reservoir 47, and two outlet ports 86 and 87 are respectively connected to the lines 31 and 32. Two portions 88 and 89 of the spool 79 are of reduced diameter to act as annular galleries and are arranged, in relation to the ports 82, 83, 84, 86 and 87, so that when the spool 79 is in its right position, as shown in FIGURE 8, the supply line 33 is connected through the port 83, the annular gallery 89 and the port 87 to feed the cylinder 30, and the cylinder 29 is exhausted through the line 31, the port 86, the annular gallery 88, the port 84 and the line 85 to the reservoir 47. When the spool 79 is moved to its left hand position the supply line 33 is connected through the port 82, the annular gallery 88, the port 86 and the line 31 to feed the cylinder 29, and the cylinder 30 is exhausted through the line 32, the port 87, the annular gallery 89, the port 84 and the line 85 to the reservoir 47.

When the spool 79 is in the position shown in FIGURE 8, operation of the clutch pedal 39 past the point corresponding to full disengagement of the clutch will cause the pressure relief valve 49 to open so that pressure fluid will be fed to the cylinder 30. However the piston 28 is already extended and the selector fork 13 is already in its left hand position so that no change of gear ratio will occur. When, however, the spool 79 is moved by the driver to its left hand position, the next operation of the clutch pedal 39 past the point corresponding to full disengagement of the clutch will cause fluid to be fed to the cylinder 29 so that the piston 27 will be extended to move the selector fork 13 to the right hand position and effect a change of gear ratio. This extension of the piston 27 will cause the piston 28 to be retracted and the fluid in the cylinder 30 will be exhausted to the reservoir 47. The fluid system is recharged from the reservoir 47 through a one-way valve 90 whose construction is identical to the one-way valve 56 in FIGURE 4. Thus, by manipulating the knob 80 the driver is enabled optionally to pre-select that on the next occasion he operates the clutch pedal 39 past the point corresponding to full disengagement of the clutch, a predetermined change in gear ratio will occur in the auxiliary change-speed gearing.

Figure 9:
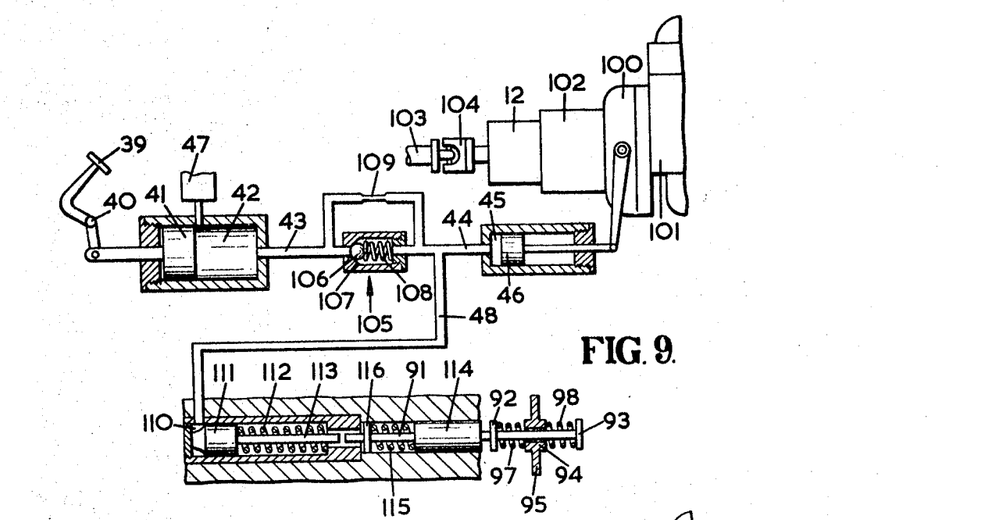
FIGURE 9 is a diagram illustrating a further embodiment of the invention.

In FIGURE 9 the clutch pedal 39 is arranged as previously described for displacing operating fluid from the clutch master cylinder 42 into the line 43. However, unlike the arrangements illustrated in FIGURES 4 and 8, the line 43 is connected to the line 44 through a one-way valve 105 comprising a ball 106 lightly held against a conical seating 107 by a spring 108, whereby operating fluid is allowed to pass freely from the clutch master cylinder 42 to the line 44 but is prevented from returning through the one-way valve 105. A restrictor 109 is arranged in parallel with the one-way valve 105 to allow fluid to return to the clutch master cylinder 42 at a predetermined controlled rate. The line 44 connects the one-way valve 105 and the restrictor 109 to the clutch disengaging cylinder 45 which is arranged to effect the disengagement of the motor vehicle clutch 100 as already described with reference to FIGURE 4.

The line 48 connects the line 44 to one end of an actuator cylinder 110 to which end a slidably supported actuator piston 111 is biased by a coiled compression spring 112 reacting against the casing of the actuatory cylinder 110. A rod 113 is fast with the actuator piston 111 and is arranged to axially abut a selector shaft 91 which is mounted for axial sliding in the cover plate of the auxiliary change-speed gearing 12 and is provided with two peripheral grooves in which are engaged respective spring clips 92 and 93. A boss 94 is slidably mounted on the selector shaft 91 intermediate the spring clips 92 and 93, and is formed integral with a selector finger 95 for effecting the gear change. A pair of preloaded compression coil springs 97 and 98 are arranged coaxially around the selector shaft 91 respectively between the spring clips 92 and 93 and the boss 94. In this manner the springs 97 and 98 tend to centralise the boss 94 between the spring clips 92 and 93, and any relative axial movement between the selector shaft 91 and the boss 94 will cause a spring load to be applied to the boss 94 in the same direction. FIGURES 1 to 4 of our aforesaid patent application give a fuller description of items 91 to 95, 97 and 98 which bear the same reference numerals to assist any cross-reference which may be desired.

Adjacent to, and coacting with, the selector shaft 91 and between the spring clip 92 and the actuator cylinder 110 is a latch unit 114 including a latch means of which there are several well known types, and whose effect will be described later. Reacting on the casing of the latch unit 114 and coaxial with the selector shaft 91, is a helically coiled compression spring 115 pressing against a collar 116 fast with the selector shaft 91.

As the clutch pedal 39 is depressed, fluid is displaced from the clutch master cylinder 42 through the line 43 and the one-way valve 105 and the line 44 to the clutch disengaging cylinder 45 so that the clutch disengaging piston 46 moves until the clutch 100 is freely disengaged. The pre-load of the spring 112 is set so that the actuator piston 111 will just start to move to the right against the bias of the spring 112 when the fluid pressure has risen to a predetermined value sufficient to effect the complete disengagement of the clutch 100. Further depression of the clutch pedal 39 forces the actuator piston 111, the associated rod 113 and the abutting selector shaft 91 to the right against the bias of the springs 112 and 115. Through the action of the spring clip 92 and the coil spring 97, the selector shaft 91 will urge the boss 94 and the selector finger 95 to the right to move the associated axially-movable toothed coupling into engagement with one of the toothed couplings to effect the engagement of the corresponding drive ratio. If synchronism is not reached immediately between the axially-movable and the coacting toothed couplings, the boss 94 will be arrested and the selector shape 91 will pass through it whereby the spring 97 will exert a resultant force urging the dogs axially together until synchronism is reached, when the boss 94 will move to the right until the springs 97 and 98 together exert no resultant force.

When the clutch pedal 39 is released, fluid will pass into the clutch master cylinder 42 through the restrictor 109 from the clutch disengaging cylinder 45 and the actuator cylinder 110 so that the clutch disengaging piston 46 and the actuator piston 111 and the associated rod 113 return to the left hand position shown in FIGURE 9.

However, as the selector shaft 91 starts to move to the left to follow the abutting rod 113, the latch unit 114 becomes operative to inhibit further movement of the selector shaft 91 towards the left. By this means, although the actuator cylinder 110 becomes exhausted of operating fluid and the actuator piston 111 is returned to its left hand position and the clutch 100 is re-engaged, the selector shaft 91 together with the coacting boss 94 and selector finger 95 are retained in the right hand position whereby the axially-movable toothed coupling is held in engagement with the said one of the coacting toothed couplings.

In order that the clutch 100 shall not re-engage during the synchronisation of the axially-movable and the coacting toothed couplings the size of the restrictor 109 is chosen, in relation the volume of operating fluid to be returned from the actuator cylinder 110 and the disengaging cylinder 45, to delay the re-engagement of the clutch 100 for an adequate period. If it is considered preferable, the line 48 may be connected to the line 43 instead of to the line 44, so that the return of operating fluid from the actuator cylinder 110 is not restricted and the actuator cylinder 110 will become empty more rapidly.

On the next occasion that the clutch pedal 39 is operated, the clutch 100 will be disengaged as before, and the actuator piston 111 will be moved to the right until its associated rod 113 abuts the end of the selector shaft 91. A slight further movement of the clutch pedal 39 in the disengaging direction causes further movement to the right of the actuator piston 111 and the rod 113 and thereby moves the selector shaft 91 to the right to cause the latch unit 114 to become inoperative.

When the clutch pedal 39 is released, the actuator piston 110 and the rod 113 are again returned to the left by the spring 112, and the action of the spring 115 on the collar 116 urges the selector shaft 91 towards the left to the position shown in FIGURE 9 so that, through the action of the spring clip 93 together with the spring 98 and the boss 94 and the selector finger 95, the axially-movable toothed coupling member becomes disengaged from the said one coacting toothed coupling for engaging one drive ratio and becomes engaged with the other coacting toothed coupling for engaging the other drive ratio. meanwhile the restrictor 109 is arranged to delay the re-engagement of the clutch 100 until synchronism of the toothed coupling members has occurred.

It will be appreciated that the latch unit 114 provides a binary mode of operation since, for every two movements of the rod 113 from the left to the right, only one movement is produced of the selector shaft 91 between its left hand and right hand positions.

Figure 10:
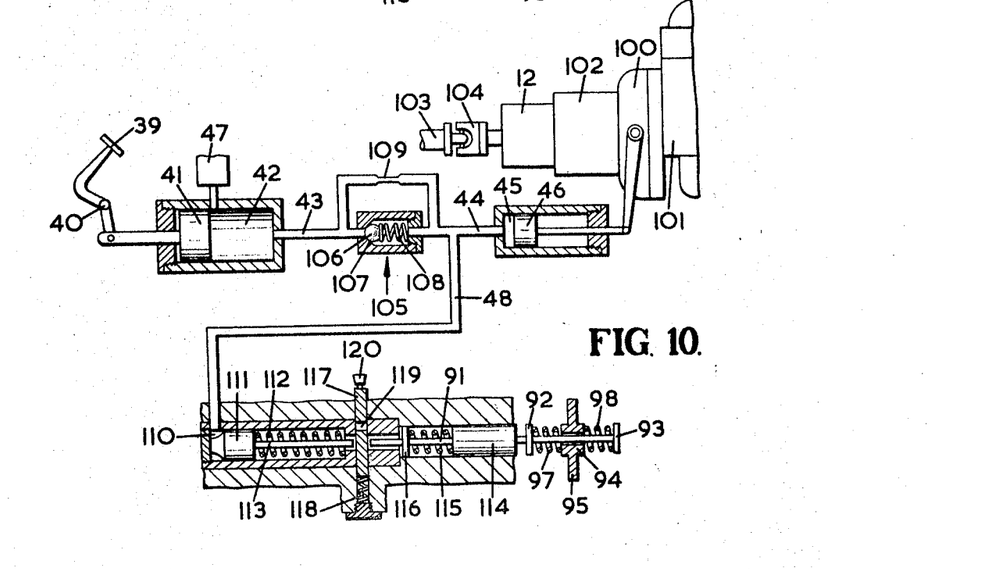
FIGURE 10 is a diagram showing a first modification of FIGURE 9.

The arrangement shown in FIGURE 10 is nearly identical to that shown in FIGURE 9 and the common components have been allocated the same reference numerals. The difference is that a baulking member 117 is slidably supported by the casing of the actuator cylinder 110 for transverse movement between the rod 113 and the selector shaft 91 when they are both in their respective left hand positions. A helically coiled compression spring 118, reacting on the casing of the actuator cylinder 110, urges the baulking member 117 to a position wherein a hole 119, whose axis is parallel to the axis of the rod 113, is misaligned with the rod 113 whereby to inhibit movement of the rod 113 to the right. When the baulking member 117 is in the operative position shown in FIGURE 10, depression of the clutch operating pedal 39 cannot move the actuator piston 27 and accordingly the disengagement and re-engagement of the clutch 100 will occur in the normal manner without any ratio change being effected in the auxiliary change-speed gearing.

However the baulking member 117 is movable, by a control means 120 optionally operable by the driver, against the action of the spring bias 118 until the hole 119 becomes aligned with the rod 113. The size of the hole 119 is adequate for the rod 113 to be able to pass through it when they are aligned so that the driver is enabled to move the baulking member 117 to its inoperative position so that a depression of the clutch pedal 39 will cause the rod 113 to be moved to the right whereby to effect a change of gear ratio in the auxiliary gearing.

Whilst the arrangement disclosed in FIGURE 10 gives the driver complete control over the selection of the ratios of the auxiliary gearing, an arrangement in which the driver does not have to operate the control means 120 for moving the baulking member 117 at the same time as he depresses the clutch operating pedal 39 may be preferred. The system illustrated in FIGURE 11 enables the driver to pre-select that the next depression of the clutch pedal 39 will effect a change of ratio in the auxiliary change-speed gearing 12. The arrangement shown in FIG- URE 11 is again almost identical to that shown in FIGURE 9 and corresponding components have been allocated the same reference numerals. The modifications incorporated in this embodiment are that a spool valve 121 has a cylindrical piston 122 of greater diameter than a coaxial integrally formed cylindrical piston 123 and these pistons are supported for axial sliding in corresponding bores 124 and 125 formed in a casing 126 which may be arranged at any convenient point in the motor vehicle, for example, it may form part of the auxiliary change-speed casing 12, the clutch master cylinder casing or the clutch disengaging cylinder casing. A coaxial rod 127 fast with the spool valve 121 coacts with a latch means in a latch unit 128, and a helically coiled compression spring 129 reacts against the casing of the latch unit 128 to bias the spool valve 121 to the right hand position shown. A control means 130 is provided for optional operation by the driver of the motor vehicle to slide the spool valve 121 towards the left against the spring 129. Two concentric axially spaced ports 131 and 132 are formed in the wall of the casing 126 and are both closed by the piston 122 when it is in the right hand position shown. The port 131 is connected by the line 48 to the line 44 and the port 132 is connected to the actuator cylinder 110 by a line 133. When in the right hand position, the piston 122 of the spool valve 121 closes the port 131 to prevent any flow of fluid to the actuator cylinder 110 whereby the operation of the clutch 100 will not effect any change in the ratio of the auxiliary gearing.

Figure 11:
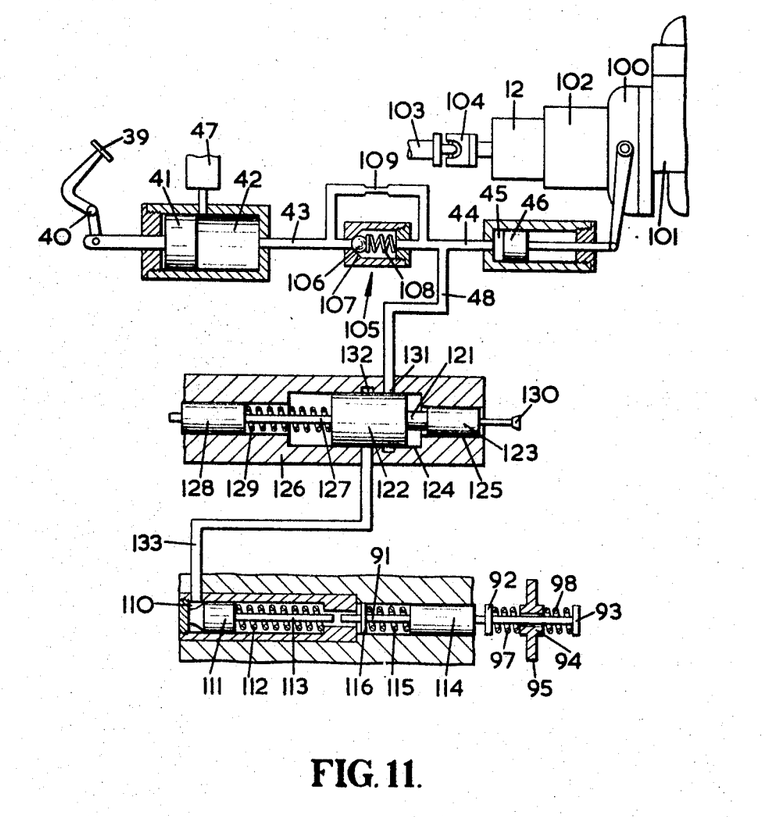
FIGURE 11 is a diagram showing another modification of FIGURE 9.

When the driver operates the control means 130, the spool valve 121 is moved leftwards to a point at which the piston 122 has uncovered the port 131. On release of the control means 130, the latch unit 128 prevents the spool valve 121 from being returned to its right hand position by the spring 129 and holds the spool valve 121 in an intermediate position where the port 131 is still open and the port 132 is still closed. When the clutch operating pedal 39 is next depressed, pressurised fluid passing through the port 131 will act on the differential areas of the pistons 122 and 123 to move the spool valve 121 leftwards against the bias of the spring 129 to a position where the port 132 is also uncovered by the piston 122 whereby pressurized fluid will pass to the actuator cylinder 110 to effect a ratio change in the auxiliary gearing as previously described with reference to FIGURE 9.

The latch unit 128 is so arranged that, when the spool valve 121 and rod 127 are moved from the intermediate position to the left hand position, the latch unit 128 will become disengaged so that it will no longer inhibit the movement of the rod 127 to the right hand position under the action of the spring 129 when the pressure of the fluid drops to a sufficiently low value.

On release of the clutch operating pedal 39, the actuator piston 111 will return to its left hand position, the clutch 100 will become re-engaged and, as the operating pressure falls, the spring 129 will urge the spool valve 121 to the right to close the ports 132 and 131.

In the embodiments of the invention illustrated in FIGURES 9, 10 and 11 the pre-load of the spring 112 is arranged to be balanced by the force exerted on the actuator piston 111 by the operating fluid when its pressure is adequate for the clutch 100 to be freely disengaged. The clutch operating pedal 39 must then be depressed further for the master cylinder piston 41 to displace enough fluid to move the actuator piston 111 to its right hand position. During this movement the load in the spring 112 will rise further and accordingly the pressure of the operating fluid must also rise to balance the increased spring force exerted on the actuator piston 111 by the spring 112.

Figure 12:
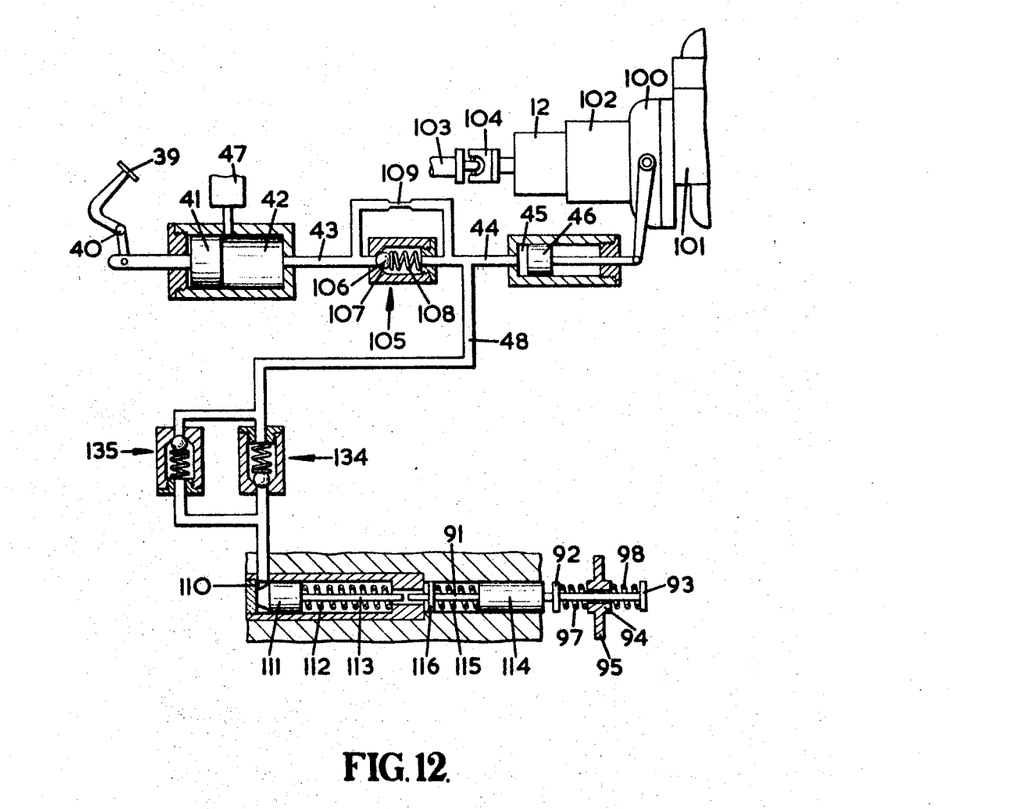
FIGURE 12 is a diagram showing a further modification of FIGURE 9.

FIGURE 12 illustrates a modification which enables the increase in fluid pressure required for operating the actuator piston 111 to be reduced so that the load that must be applied to the clutch operating pedal 39 is also reduced. The arrangement shown in FIGURE 12 is almost identical to that shown in FIGURE 9 and corresponding components have been allocated the same reference numerals. The modifications incorporated in this embodiment are that a one-way valve 134 is arranged in the passage 48 to prevent the flow of any pressurized operating fluid into the actuator cylinder 110 whilst leaving an unrestricted exhaust path for fluid to flow from the actuator cylinder 110. Connected in parallel with the one-way valve 134 is a pressure relief valve 135 which prevents any flow of fluid away from the actuator cylinder 110 and will not open to allow fluid to flow into the actuator cylinder 110 until the operating fluid pressure has reached the value at which the clutch 110 will be freely disengaged—below this pressure no fluid can flow into the actuator cylinder 110 so that the disengagement of the clutch 100 will be normal. In the embodiment shown in FIGURE 9, this feature was achieved by the force exerted on the actuator piston 111 by the preloaded spring 112. However, in the embodiment shown in FIGURE 12 the spring 112 is of low rate and preload and the area of the actuator piston 111 is such that the operating fluid pressure in the actuator cylinder 110 required to hold the actuator piston 111 in the right hand position against the bias of the spring 112 is less than the pressure in the line 48 when the relief valve 135 opens. As fluid flows into the actuator cylinder 110 and the actuator piston 111 moves to the right, the pressure in the passage 48 will remain constant and will not rise as is the case with the embodiment shown in FIGURE 9. The embodiment shown in FIGURE 12 therefore operates with a smaller operating load on the clutch pedal 39 than the embodiment shown in FIGURE 9. The one-way valve 134 enables the pressure in the actuator cylinder 110 to fall to the system pressure as the clutch operating pedal 39 is released. The inclusion of the one-way valve 134 and the pressure relief valve 135 together with the lower rate and preload of the spring 112 is equally applicable to the arrangements shown in FIGURES 10 and 11. Although the various embodiments of the invention that have been described are fluid pressure operable, they could be arranged to be operated by electrical, electro-magnetic or any other means using elements which would perform in an analogous manner to those described.

Also, if desired, the latching units 114 and 128 used in FIGURES 9 to 11 and their associated mechanically operable components may be replaced by fluid, electrical or electromagnetic systems, provided that the required binary mode of operation is attained.

Furthermore, the actuator pistons 27 and 28 utilised in the embodiments disclosed in FIGURES 1 to 8 could be arranged to operate the selector shaft 91 and associated components 92 to 95, 97 and 98 shown in FIGURES 9 to 11. Similarly, the selector shaft 91 and its said associated components shown in FIGURES 9 to 11 may, if desired be replaced by the selector shaft 15 illustrated in FIGURES 1 to 8.

It will also be appreciated that various modifications can be made to the several embodiments disclosed to suit individual requirements—in particular the hydraulic circuit of each embodiment is generally applicable either by itself or in combination to the control of the other embodiments.

What we claim as our invention and desire to secure by Letters Patent of the United States is:

1. An auxiliary change-speed gearing connected to be driven from an engine through a clutch, said auxiliary change-speed gearing including an axially-movable toothed coupling optionally movable between a first position and a second position, a first complementary toothed coupling arranged to be engaged by said axially-movable toothed coupling when in its said first position, the engagement of said axially-movable toothed coupling with said first complementary toothed coupling causing said auxiliary change-speed gearing to transmit drive at one ratio, a second complementary toothed coupling arranged to be engaged by said axially-movable toothed coupling when in its said second position, the engagement of said axially-movable toothed coupling with said second complementary toothed coupling causing said auxiliary change-speed gearing to transmit drive at another ratio, a main change-speed gearing is arranged in series with said auxiliary change-speed gearing, said clutch is arranged operatively between said engine and both said main change-speed gearing and said auxiliary change-speed gearing, and a driver-actuable control member is arranged when operated to disengage said clutch wherein the improvement comprises the driver-actuable control member being arranged to produce a signal when operated to a predetermined greater extent than necessary for usual disengagement of the clutch, and an actuator is arranged to be operated by said signal for effecting movement of the axially-movable toothed coupling to engage one of said complementary toothed couplings.

2. Apparatus as in claim 1, including a clutch disengaging member, a fluid circuit connected to actuate said clutch disengaging member, said driver-actuable control arranged when operated to alter the pressure in said fluid circuit to actuate said clutch disengaging member to disengage said clutch, and said signal is a predetermined pressure in said fluid circuit at which said clutch is fully disengaged.

3. Apparatus as in claim 2, in which said actuator includes a fluid pressure operable piston slidably supported by a coacting cylinder, a fluid passage connects said piston to said fluid circuit to receive said pressure signal, and said actuator piston is connected to move said axially-movable toothed coupling when said pressure signal is applied to said actuator piston.

4. Apparatus as in claim 3, in which a pressure relief valve is arranged operatively between said fluid circuit and said actuator piston to open whenever the pressure in the fluid circuit reaches said predetermined pressure thereby applying said pressure signal to said actuator piston.

5. Apparatus as in claim 4, in which a non-return valve is arranged operatively between said fluid circuit and said actuator piston to allow the free exhaust of fluid from said actuator piston during the re-engagement of said clutch.

6. Apparatus as in claim 5, in which valve means are arranged in said fluid circuit for delaying the reengagement of said clutch whilst said axially-movable toothed coupling is being moved by said actuator piston to engage one of said complementary toothed couplings.

7. Apparatus as in claim 2, in which a pressure relief valve is arranged operatively between said fluid circuit and said actuator to open whenever the pressure in the fluid circuit reaches said predetermined pressure thereby applying said pressure signal to said actuator.

8. Apparatus as in claim 2, in which a non-return valve is arranged operatively between said fluid circuit and said actuator to allow the free exhaust of fluid from said actuator during the re-engagement of said clutch.

9. Apparatus as in claim 2, in which valve means are arranged in said fluid circuit for delaying the reengagement of said clutch whilst said axially-movable toothed coupling is being moved by said actuator to engage one of said complementary toothed couplings.

10. Apparatus as in claim 1, in which a pair of opposed spring means operatively connect the actuator to said axially-movable toothed coupling whereby the resilience of the spring means permits the actuator to be operated before the axially-movable toothed coupling is moved into engagement with either one of said complementary toothed couplings such that synchronism can take place before the axially-movable toothed coupling engages the said complementary toothed coupling.

11. Apparatus as in claim 3, in which a spring means biases said actuator piston to an inoperative position, and the load exerted by said spring means on said actuator piston is of such a value that said actuator piston cannot be moved by the pressure in said fluid circuit until the pressure exceeds said predetermined value.

12. Apparatus as in claim 1, in which a bias means urges said axially-movable coupling into engagement with said first complementary toothed coupling, said actuator includes an actuating member movable in opposition to said bias means whenever said signal is produced, a latch means is connected to said actuating member such that a first signal received by said actuator will cause said actuating member to move the axially-movable toothed coupling to be engaged with the second complementary toothed coupling against the action of the bias means and to be retained by the action of the latch means, and a subsequent signal received by said actuator will cause said actuating member to be released by said latch means for the bias means to urge the axially-movable toothed coupling into engagement with said first complementary toothed coupling.

13. Apparatus as in claim 12, in which a spring means biases said actuator piston to an inoperative position, and the load exerted by said spring means on said actuator piston is of such a value that said actuator piston cannot be moved by the pressure in said fluid circuit until the pressure exceeds said predetermined value.

14. Apparatus as in claim 3, in which a bias means urges said actuator piston with a low force to an inoperative position, a pressure relief valve which will only allow fluid to pass when the said predetermined pressure is exceeded connects said fluid circuit to said actuator piston, and a non-return valve is arranged operatively between said fluid circuit and said actuator piston to allow the free exhaust of fluid from said actuating cylinder when said clutch is being re-engaged.

15. Apparatus as in claim 14, in which valve means are arranged in said fluid circuit for delaying the re-engagement of said clutch whilst said axially-movable toothed coupling is being moved by said actuator to engage one of said complementary toothed couplings.

16. Apparatus as in claim 15, in which said valve means is a one-way restrictor means arranged to allow the fluid to flow freely to said clutch disengaging member and also arranged to slow down the exhaust of fluid from said clutch disengagement member.

17. Apparatus as in claim 16, in which said one-way restrictor is also arranged to slow down the exhaust of fluid from the actuator cylinder whilst the clutch is being re-engaged.

18. Apparatus as in claim 9, in which said valve means is a one-way restrictor means arranged to allow the fluid to flow freely to said clutch disengaging member and also arranged to slow down the exhaust of fluid from said clutch disengaging member.

19. Apparatus as in claim 18, in which said one-way restrictor is also arranged to slow down the exhaust of fluid from the actuator cylinder whilst the clutch is being re-engaged.

20. Apparatus as in claim 1, including an additional control means arranged to be operated if the gear ratio of the auxiliary gearing is to be changed, a baulking device inhibits the actuation of said actuator, and said additional control means when operated is arranged to inhibit the action of said baulking device.

21. Apparatus as in claim 20 and in which the actuator includes an actuator piston, in which said baulking device is movable by said additional control means from a first position to a second position, a return spring urges said baulking device to its said first position, said baulking device defines a gate through which said actuator piston can freely pass when said baulking device is operated to its said second position, and said baulking device inhibits movement of said actuator piston when said baulking device is in its said first position.

22. Apparatus as in claim 3, including an additional control means arranged to be operated if the gear ratio of said auxiliary gearing is to be changed, a fluid control valve arranged operatively between said fluid circuit and said actuator cylinder for preventing the flow of fluid into said actuator cylinder, said fluid control valve actuable to a position in which it allows fluid to flow from said fluid circuit into said actuator cylinder, and said additional control means when operated arranged to actuate said fluid control valve.

23. Apparatus as in claim 22, in which said fluid control valve is a spool valve movable between a first position and a second position and a third position and arranged operatively between said fluid circuit and said actuator cylinder, a bais means urges said spool valve to its said position and said additional control means is arranged to move said spool valve to its said second position against said bias means, said spool valve defines a piston area opposed to said bias means, said spool valve when in said first position interrupting the supply of any fluid from the fluid circuit to either said piston area or said actuator cylinder, said spool valve when in said second position still interrupting the supply of any fluid from the fluid circuit to said actuator cylinder but establishing a fluid supply from said fluid circuit to said piston area, said spool valve when in said third position establishing a supply of fluid from the fluid circuit to said actuator cylinder whilst maintaining a fluid supply from said fluid circuit to said piston area, a latch means arranged to hold the spool valve in its said second position against the action of the bias means whereby the said pressure signal will be applied from the fluid circuit to act on said piston area to move said spool valve to its said third position for operating said actuator piston, and the movement of said spool valve to its said third position is arranged to release said latch means whereby the spool valve will be returned to its said first position by said bias means when the fluid pressure acting on said piston area drops due to the re-engagement of the clutch.

24. Apparatus as in claim 1, in which said actuator includes a first actuator portion, a second actuator portion, a first lever means arranged to be operated by said first actuator portion to move said axially-movable toothed coupling from said first position to said second position, a second lever means arranged to be operated by said second actuator portion to move said axially-movable toothed coupling from said second position to said first position, a baulking means operable between one position in which it prevents movement of said first lever means and another position in which it will prevent movement of said second lever means, a bias means acting on said baulking means and being arranged to be operated by the movement of the axially-movable toothed coupling between a first position in which the bias means urges the baulking means to the said another position and a second position in which the bias means urges the baulking means to the said one position, the movement of the axially-movable toothed coupling to its first position operating said bias means to its first position, and the movement of the axially-movable toothed coupling to its second position operating said bias means to its said second position whereby the application of successive signals simultaneously to energise both actuator portions will effect movement of the axially-movable toothed coupling alternately to its said first and second positions.

25. Apparatus as in claim 24, in which said baulking means comprises a lever, a pivot supporting the centre of said lever, two baulking members arranged one at each end of said lever, said bias means when in its said first position being arranged to swing said lever in one sense about its said pivot for one of said baulking members to engage said second lever means to inhibit movement thereof whilst said axially-movable toothed coupling is in its said first position, the movement of said axially-movable toothed coupling from its said first position to its said second position moves said bias means past the said pivot to its said second position, and bias means when in its said second position being arranged to swing said lever in the opposite sense about its said pivot for the other of said baulking members to engage said first lever means to inhibit movement thereof whilst said axially-movable toothed coupling is in its said second position.

26. Apparatus as in claim 25, in which a further bias means is arranged operatively between said first and second lever means such that said first and said second lever means are urged by said further bias means to return both of said actuator portions to their inoperative positions whenever said clutch is re-engaged.

27. Apparatus as in claim 24, in which said baulking means comprises two levers, two fixed pivots each supporting a respective one of said levers at one end, two baulking members arranged respectively one at the other end of said levers, one of said baulking levers being movable about its said fixed pivot to an inhibiting position in which its baulking member engages said first lever means thereby to inhibit the operation of said first actuator portion, the other of said baulking levers being movable about its said fixed pivot to an inhibiting position in which its baulking member engages said second lever means thereby to inhibit the operation of said second actuator portion, a connecting link operatively interconnects said two baulking levers whereby at any instant only one of said baulking levers can be in its inhibiting position, said bias means comprises two springs, the first of said springs interconnecting said other baulking lever and said axially-movable toothed coupling, the second of said springs interconnecting said one baulking lever and said axially-movable toothed coupling, said first and second springs arranged such that when the axially-movable toothed coupling is in its said first position said first spring will bias said other baulking lever into its said inhibiting position, and when the axially-movable toothed coupling is in its said second position the said second spring will bias said one baulking lever into its said inhibiting position.

28. Apparatus as in claim 1, in which a driver-operable inhibitor means is arranged to inhibit the transmission of any signal to said actuator whereby the driver can select when the next signal produced by said driver-actuable control member will effect a change of drive ratio in said auxiliary gearing.

29. Apparatus as in claim 28, in which said actuator includes a first actuator portion for moving said axially-movable toothed coupling from said first position to said second position and a second actuator portion for moving said axially-movable toothed coupling from said second position to said first position, a fluid reservoir, said inhibitor means includes a fluid control valve movable between one position in which it connects said fluid system to said first actuator portion and connects said second actuator portion to said reservoir, and another position in which said fluid control valve connects said fluid system to said second actuator portion and connects said first actuator portion to said reservoir.

30. Apparatus as in claim 1, in which alternator means are arranged intermediate said actuator and said axially-movable toothed coupling whereby successive operations of said driver-actuable control will cause said actuator to effect ratio changes alternately to the said one and to the said other drive ratios.

References Cited

UNITED STATES PATENTS

| | | |
|---|---|---|
| 2,137,939 | 11/1938 | Eaton. |
| 2,181,532 | 11/1939 | Hill et al. |
| 2,753,024 | 7/1956 | Weaving et al. |
| 2,955,691 | 10/1960 | Brueder. |
| 2,964,150 | 12/1960 | Chivari. |
| 3,245,504 | 4/1966 | Wickman _________ 74—740 |

BENJAMIN W. WYCHE III, Primary Examiner

U.S. Cl. X.R.

192—114, 87